(12) United States Patent
Seisenbaeva et al.

(10) Patent No.: US 10,787,722 B2
(45) Date of Patent: Sep. 29, 2020

(54) SEPARATION OF RARE EARTH ELEMENTS FROM OTHER ELEMENTS

(71) Applicants: Gulaim A. Seisenbaeva, Uppsala (SE); Elizabeth Polido Legaria, Märsta (SE); Vadim Kessler, Uppsala (SE)

(72) Inventors: Gulaim A. Seisenbaeva, Uppsala (SE); Elizabeth Polido Legaria, Märsta (SE); Vadim Kessler, Uppsala (SE)

( * ) Notice: Subject to any disclaimer, the term of this patent is extended or adjusted under 35 U.S.C. 154(b) by 0 days.

(21) Appl. No.: 16/307,124

(22) PCT Filed: May 10, 2017

(86) PCT No.: PCT/SE2017/000025
§ 371 (c)(1),
(2) Date: Dec. 4, 2018

(87) PCT Pub. No.: WO2017/200449
PCT Pub. Date: Nov. 23, 2017

(65) Prior Publication Data
US 2019/0226055 A1     Jul. 25, 2019

(30) Foreign Application Priority Data
May 17, 2016 (SE) .................................. 1600165

(51) Int. Cl.
| C22B 59/00 | (2006.01) |
| C22B 3/44 | (2006.01) |
| C22B 7/00 | (2006.01) |
| B09B 3/00 | (2006.01) |
| C01F 17/206 | (2020.01) |
| H01J 9/52 | (2006.01) |

(52) U.S. Cl.
CPC ............... *C22B 59/00* (2013.01); *B09B 3/00* (2013.01); *C01F 17/206* (2020.01); *C22B 3/44* (2013.01); *C22B 7/007* (2013.01); *C01P 2004/80* (2013.01); *H01J 9/52* (2013.01); *Y02P 10/234* (2015.11); *Y02W 30/84* (2015.05)

(58) Field of Classification Search
CPC .................................................... C22B 59/00
See application file for complete search history.

(56) References Cited

U.S. PATENT DOCUMENTS

| 2014/0023571 A1 | 1/2014 | Braconnier et al. |
| 2015/0086449 A1* | 3/2015 | Sugita ................... C22B 3/44 |
| | | 423/21.1 |

OTHER PUBLICATIONS

Polido Legaria et al., "Molecular insights into the selective action of a magnetically removable complexone-grafted adsorbent", Dalton Transactions, 2015, 44: 1273-1282.
Pogorilyi et al., "New product from old reaction: uniform magnetite nanoparticles from iron-mediated synthesis of alkali iodides and their protection from leaching in acidic media", RSC Advances, 2014, 4: 22606-22612.
Swedish Search Report issued for Swedish Patent Application No. 1600165-3, dated Nov. 17, 2016.
Dupont et al., "Acid-Stable Magnetic Core-Shell Nanoparticles for the Separation of Rare Earths", Industrial & Engineering Chemistry Research, 2014, 53: 15222-15229.
Extended European Search Report issued for European Patent Application No. 17799754.1, dated Feb. 10, 2020.
Naser et al., "Elaboration of Impregnated Composite for Sorption of Europium and Neodymium Ions from Aqueous Solutions", Journal of Industrial and Engineering Chemistry, 2015, 32: 264-272.

* cited by examiner

*Primary Examiner* — Melissa S Swain
(74) *Attorney, Agent, or Firm* — James S. Keddie; Bozicevic, Field & Francis LLP

(57) ABSTRACT

A process for separating rare earth elements (REE) from Ca, Mg and other non-REE elements comprises raising the pH of an acidic aqueous solution of REE to pH 8 to pH 11; adding nano- or micro (NoM) particles having a silica or titanium oxide surface; agitating the suspension for 6 h to 48 h to provide for adherent crystallization of REE hydroxide on the particles; separating the particles from the solution; releasing REE by treatment with aqueous acid to form an aqueous solution of REE salt; separating them from the aqueous solution of REE salt formed. The acidic aqueous solution comprising REE is preferably provided by leaching of an REE mineral with aqueous acid; adding a base to bring the pH to from pH 4.0 to pH 6.5; separating precipitated non-REE hydroxide from the solution.

20 Claims, No Drawings

US 10,787,722 B2

SEPARATION OF RARE EARTH ELEMENTS FROM OTHER ELEMENTS

CROSS-REFERENCE TO RELATED APPLICATIONS

This application is a § 371 national phase of International Application No. PCT/SE2017/000025, filed on May 10, 2017, which claims the benefit of Swedish Patent Application No. 1600165-3, filed on May 17, 2016, which applications are incorporated by reference herein.

FIELD OF THE INVENTION

The present invention relates to a method for separation of rare earth elements (REE) from other elements and to a means for use in the method.

BACKGROUND OF THE INVENTION

Important sources of REE are naturally occurring ores and industrial waste obtained by recycling of magnetic, electronic or other REE containing materials. In the sources REE are accompanied by large amounts of other elements from which they must be separated prior to refining.

Known REE separation or enrichment methods start with treating the ore or waste with strong mineral acid to produce aqueous solutions of REE salts. In addition to REE these highly acidic solutions contain various elements in cationic form, such as $Ca^{2+}$, $Fe^{3+}$, $Mg^{2+}$, but often additionally $Co^{2+}$, $Zr^{4+}$, $Th^{4+}$, $U^{3+}$ etc. The composition of the accompanying non-REE elements varies considerably from source to source. While some elements in cationic form, such as $Fe^{3+}$, $Co^{2+}$, $Ti^{4+}$ and $Zr^{4+}$ can be efficiently removed from the acidic solution by increasing pH to about 6.5 so as to precipitate them in form of their oxides, the separation of REE from $Ca^{2+}$ and $Mg^{2+}$ represents a considerable challenge [1]. State-of-art methods for separation of REE from elements whose hydroxides are not precipitated or are only partially precipitated at pH 6.5 include solvent extraction using toxic chemicals and hazardous organic solvents [2] or extraction with expensive and often poisonous ionic liquids, which are difficult to recycle [3]. Separation of different REE from each other by chromatographic or other methods is conditioned by their prior separation from major non-REE contaminants [4].

A problem with waste solutions originating from industrial processes of this kind is their low but environmentally nevertheless burdening content of trace amounts of REE. A solution of this problem has recently been sought in the use of magnetic micro and nano particles. By suspending the particles in the waste solution they become loaded with REE and can be easily removed by magnetic means. Iron oxide particles [5] and carbon particles [6] have been employed for this purpose. The affinity of the magnetic and other micro- and nanoscale magnetic particles to REE is however low, such as less than 0.03 mmol/g or 5 mg/g of REE. To improve their REE load capacity multidentate N.O-donor ligands have been grafted on their surface by means of siloxane type reagents [7, 8], such as, for instance, ethylene diamine triacetic acid onto the surface of graphene, $SiO_2$, $TiO_2$, and iron oxide particles. The capacity of the multidentate adsorbents towards REE is in the range 30-100 mg/g, making their industrial application feasible. The particles with their load of adsorbed REE are separated from the aqueous media, then suspended in a strong mineral acid to release the adsorbed REE in salt form.

There is however an economic factor conditioning the use of such particles, namely their capability to be used more than once in the process. The particles thus have to be sufficiently stable to withstand the highly acidic conditions of pH<1 required for efficient REE desorption. Detailed studies have been carried out to identify suitable materials for surface modification possessing high affinity to REE cations, such as chitosan [9]. An alternative approach is silica coating of magnetic (usually iron oxide based) solid extractants [10]. Application of mesoporous silica with physically adsorbed polyamino functions turned to be not attractive in view of the high cost and poor stability of the adsorbent [11]. A layer of dense silica on magnetic iron oxide nanoparticles of at least 20 nm in thickness stabilizes them sufficiently for multiple use in highly acidic media.

OBJECTS OF THE INVENTION

A primary object of the present invention is to provide a method of separating REE from aqueous solutions of their salts comprising large amounts of contaminating non-REE such as $Mg^{2+}$ and $Ca^{2+}$.

Further objects of the present invention will become evident from the following short description of the invention and the description of preferred embodiments thereof.

SUMMARY OF THE INVENTION

According to the present invention is provided a process for separation of REE from aqueous media by adhering crystallisation of their hydroxides on the surface of nano- or microparticles, in the following called NoM particles. Their adherence to the particle surface enables the REE hydroxides to be removed with the particles from the aqueous media. In contrast to REE, calcium and magnesium hydroxide as well as hydroxides of other metals not removed by precipitation at pH 6.5 do not crystallise in an adhering manner on NoM particles and thus can be separated from REE loaded NoM particles.

Adhering crystallization of REE on NoM particles is triggered by raising the pH of a solution comprising REE salts to a REE oxide crystallisation pH in the range from about pH 8 to about pH 11, in particular from about pH 9 to about pH 10. In particular pH is raised from about pH 6.5 to a pH in the range of from pH 8 to pH 11, in particular to a pH in the range of from pH 9 to pH 10. In principle, any base can be used for raising the pH. Preferred bases are ammonia, sodium hydroxide, potassium hydroxide, and their mixtures. The base is preferably added in form of an aqueous solution. Addition of base is controlled by monitoring pH.

Industrially suitable NoM particles for adhering crystallisation of REE hydroxides include particles consisting of silica ($SiO_2$), particles comprising a layer of silica on their surface, particles consisting of titanium oxide ($TiO_2$), and particles comprising a layer of titanium oxide on their surface. A layer of silica or titanium oxide on a particle that is insufficiently stable against the action of strong mineral acid, such as an $Fe_3O_4$ particle, is at least 10 nm thick, preferably at least 20 nm, in particular at least 25 nm or 40 nm.

For loading with REE oxide by adherent crystallisation the NoM particles are kept suspended in the aqueous medium at an REE oxide crystallisation pH for a loading period of from 4 h to 48 h or more, preferably for a loading period of from 12 h to 36 h such as, for instance for a loading period of about 24 h. The particles are kept in suspension by stirring the aqueous media or by agitating the container holding the aqueous media.

After having been loaded with REE oxide the NoM particles are separated from the aqueous media by any suitable means, such as filtration, centrifugation, decantation of the media or, in case of magnetic NoM particles, by magnetic means.

For recovery of REE the REE oxide loaded NoM particles are suspended in an acidic aqueous media, in particular one of pH 2 or less, preferably of pH 1 or less, so as transform REE hydroxide into a water soluble REE salt. The acidic aqueous media is preferably a strong inorganic acid, such as one pertaining to the group hydrochloric acid, hydrobromic acid, nitric acid. Upon dissolution of REE hydroxide in form of REE salt the NoM particles are separated from the acidic aqueous media by any suitable means, such as filtration, centrifugation, decantation of the media. Magnetic NoM particles can also be separated from the acidic aqueous media by magnetic means.

The thus obtained aqueous solutions of REE salt can be further processed by means of known methods for separation of individual REE such as by chromatographic methods.

In particular, according to the present invention is disclosed a process for separation of rare earth elements (REE) from non-REE elements such as calcium and magnesium, comprising:
a) Providing an acidic aqueous solution of REE, calcium and magnesium;
b) Adding a base to bring the pH of the solution to from pH 8 to pH 11, in particular to from pH 9 to pH 10, to form REE hydroxide;
c) Adding nano- or micro (NoM) particles selected from silica particles, titanium oxide particles and particles covered by a layer of silica to the solution to provide a particle suspension;
d) Agitating the particle suspension for a time period of from 6 h to 48 h, in particular of from 12 h to 36 h, most preferred for about 24 h, to provide for adherent crystallization of REE hydroxide on the particles;
e) Separating the particles loaded with REE hydroxide from the aqueous solution;
f) Releasing REE from the particles by treatment with aqueous acid to form an aqueous solution of REE salt;
g) Separating the non-loaded particles from the aqueous solution of REE salt;
with the proviso that step c) can precede step b).

While temperatures from about 5° C. to about 40° C. and even more are acceptable for carrying out the process, an ambient temperature such as from 10° C. to 30° C. in particular from 15° C. to 25° C. is preferred. Preferred NoM particles for use in the process are iron(III)oxide particles covered with a layer of silica. The particles loaded with REE hydroxide can be separated from the aqueous solution by any useful means, in particular by one or more of: filtration, decantation, centrifugation, magnetic means.

While any strong base dissolvable in aqueous media can be used in the process, it is preferred to use one or more of the group consisting of ammonia, sodium hydroxide, potassium hydroxide. While the base can be provided in any useful form, such as a powder or granulate or gas, it is preferred to provide it in form of its aqueous solution.

While NoM particles for use in the invention can have a diameter of from 5 nm to 100 μm, in particular of from 10 nm to 50 μm, the diameter of a non-silica NoM particle covered by a silica layer for use in the invention is at least 30 μm or more, in particular at least 50 μm or more. It is preferred for the silica layer on such particle to have a thickness of at least 10 μm thick, preferably of at least 20 μm.

Separation of non-loaded particles from the aqueous solution of REE salt formed in the process of the invention can be carried out by any useful means such as, for instance, by filtration, decantation, centrifugation or by magnetic means.

It is important to continuously monitoring pH of the aqueous solution provided in step a) during a process step in which pH is increased by addition of base.

According to another preferred aspect of the invention treatment with aqueous acid of the aqueous suspension of particles loaded with REE hydroxide is carried aqueous acid is carried out at pH 2 or lower, in particular at pH 1 or lower. Preferred acids for this treatment pertain to the group consisting of nitric acid, hydrochloric acid, hydrobromic acid.

According to a particularly preferred aspect of the invention the acidic aqueous solution of REE, calcium and magnesium of step a) is provided by:
i) Leaching a mineral comprising REE with aqueous acid at pH 2 or lower, in particular at pH 1 or lower, to form an acidic solution comprising REE, magnesium, calcium, iron (III);
ii) Adding a base to bring the pH of the leaching solution to a pH of from 4.0 to 6.5;
iii) Separating precipitated iron(III)hydroxide by means of filtration, decantation or centrifugation so as to obtain said aqueous solution of REE, calcium and magnesium of step a).

It is preferred for the base added in step ii) to be selected from ammonia, sodium hydroxide, potassium hydroxide. The base is preferably added in form of an aqueous solution thereof.

While the method of the invention is applicable to the separation of any lanthanide it is preferred it is preferred for REE to be selected from the group consisting of lanthanum, dysprosium, neodymium.

The pH of the acid solution provided in step i) should be continuously monitored during addition of base in step ii).

The present invention will now be described in more detail by reference to a number of preferred embodiments, some of which are illustrated in a drawing comprising several figures.

DESCRIPTION OF PREFERRED EMBODIMENTS

Materials and Methods

Imaging and measurements were performed with a Hitachi TM-1000 tabletop Scanning Electron Microscope with an Oxford Instruments plc. Beryllium-window Energy Dispersive X-ray Spectroscopy detector. Imaging was done using a backscattering electron detector with the preset charge-up reduction mode and standard issue Hitachi software was used to control the instrument. The accelerating voltage was preset at 15 kV. Not less than 5 independent measurements were made at magnifications ×500, ×1000 and ×5000. The data obtained in the form of wt % in heavy element (silicon and metal) content were compared and averaged. Complexometric titration of lanthanides ($Dy^{3+}$, $Nd^{3+}$, $La^{3+}$). Titration was carried out in mother liquor over IDA bonded silica covered $Fe_3O_4$ nanoparticles. Stock solutions containing 0.0215 M $Dy(NO_3)_3$, 0.0125 M $Nd(NO_3)_3$ and 0.022 M $La(NO_3)_3$ were prepared. To 50 mg of $Fe_3O_4$—

SiO$_2$ NPs, a calculated amount of lanthanide salt solution (corresponding to the number of moles of IDA grafted on the surface) was added. NaNO$_3$ 1 M was added up to a final concentration of 0.1 M in a total volume of 20 mL, which was completed with distilled water. The mixtures were then sonicated in order to disperse the nanoparticles in the solution and they stayed in static sorption conditions for different times (2, 8, 24 and 48 hours). After the corresponding time, the mixtures were poured into centrifuge tubes, centrifuged at 10.000 rpm for 10 minutes and washed once with distilled water (20 mL). Both the first and the washing solutions were collected in an Erlenmeyer and the solid sorbent was dried under N$_2$ (g) at room temperature. The collected solutions were titrated with Trilon B 5 mM using xylenol orange as indicator. Trilon B complexates metals in a 1:1 ratio, therefore the amount of lanthanides adsorbed to the surface of the Fe$_3$O$_4$—SiO$_2$ NPs could be calculated by subtraction, since the initial amount is known and the remaining amount in solution is determined by titration. The titrations were repeated in triplicate for control of reproducibility.

Example 1. Recovery of Neodymium from an Aqueous Solution by Means of 80-100 nm SiO$_2$ Nanoparticles; pH Adjusted to pH 9.0 with Aqueous Ammonia SiO$_2$ nanoparticles of a diameter of about 80-100 nm were synthesized according to Stöber [12]. In order to maintain ionic strength the particles (50 mg) were contacted with 6.5 mL of a 0.025 M solution of Nd(NO$_3$)$_3$·6H$_2$O (CAS No: 16454-60-7, Sigma Aldrich, ref. 289175) and 2 mL of 1M NaNO$_3$ (CAS No: 7631-99-4, Sigma Aldrich, ref. 221341). Volume was filled up to 20 mL with miliQ water and pH was adjusted to pH 9 by dropwise addition of 5% aqueous NH$_4$OH (CAS No: 1334-21-6, Sigma Aldrich, ref. 09857). The resulting mixture was orbitally shaken for 24 h. The particles loaded with Nd(OH)$_3$ were separated by centrifugation and dried under nitrogen. The amount of REE remaining in the solution was determined by complexometric titration with EDTA (CAS No. 6381-92-6). EDTA forms complexes with REE in a 1:1 ratio and therefore, by titrating the remaining amount in the solution, the uptake of REE by the particles can be determined by subtraction between the initial amount and the remaining in solution. This analysis revealed an uptake capacity of 443 mg Nd$^{3+}$/g SiO$_2$ nanoparticles, corresponding to a recovery of 93%.

Example 2. Recovery of Neodymium from an Aqueous Solution by Means of 80-100 nm SiO$_2$ Nanoparticles; pH Adjusted to pH 8.0 with Aqueous Ammonia Particles and procedure as in Example 1 but pH adjusted to pH 8. The loaded particles were checked by energy-dispersive X-ray spectroscopy (EDS) analysis, repeating the analysis at least 5 times on different random points for all samples, revealing an uptake capacity of 332 mg Nd$^{3+}$/g SiO$_2$.

Example 3. Recovery of Neodymium from an Aqueous Solution by Means of 80-100 nm SiO$_2$ Nanoparticles; pH Adjusted to pH 8.0 with Aqueous Ammonia Particles and procedure as in Example 1 but pH adjusted to pH 10. The loaded particles were checked by EDS (five scans), revealing an uptake capacity of 947 mg Nd$^{3+}$/g SiO$_2$.

Example 4. Recovery of Lanthanum, Dysprosium and Neodymium from an Aqueous Solution by Means of 80-100 nm Functionalised SiO$_2$ Nanoparticles; pH Adjusted to pH 9.0 with Aqueous Ammonia The surface of SiO$_2$ nanoparticles of Example 1 was functionalised with iminodiacetic acid derivate organosilane [13]. The functionalised nanoparticles (100 mg) were contacted with 12.5 mL of a 0.025 M lanthanide trinitrate hexahydrate solution comprising equimolar amounts of lanthanum, dysprosium and neodymium. Particle loading and separation was performed as in Example 1. EDS analysis (five scans) showed an average adherence of 280 mg for Nd$^{3}$+, 400 mg for Dy$^{3+}$ and 607 mg for La$^+$ per g SiO$_2$ nanoparticles respectively.

Example 5. Recovery of Dysprosium from an Aqueous Solution by Means of 80-100 nm SiO$_2$ Nanoparticles; pH Adjusted to pH 9.5 with Aqueous Sodium Hydroxide Particles and procedure as in Example 1 except of adjustment of pH by 1 M aqueous NaOH, final pH 9.5. Nanoparticles (25 mg) were contacted with 3.1 mL of 0.02 M Dy(NO$_3$)$_3$·6H$_2$O (CAS No: 100641-13-2. Sigma Aldrich, ref. 289175). EDS analysis (five scans) showed an average adherence of 1804 mg Dy$^{3+}$/g SiO$_2$.

Example 6. Recovery of Dysprosium from an Aqueous Solution by Means of 80-100 nm SiO$_2$ Nanoparticles; pH Adjusted to pH 9.5 with Aqueous Potassium Hydroxide Particles and procedure as in Example 5, except for adjusting pH with 1M aqueous KOH to a final value of pH 9.5. EDS analysis (five scans) showed an average Dy adherence 826 mg Dy$^{3+}$/g SiO$_2$.

Example 7. Recovery of Neodymium from an Aqueous Solution by Means of 100 nm Silica Covered Fe$_3$O$_4$ Nanoparticles; pH Adjusted to pH 9.0 with Aqueous Ammonia Core-shell magnetic silica covered nanoparticles of about 100 nm in size comprising a silica layer of about 25 nm in thickness were synthesized by the Stöber method. The nanoparticles (15 mg) were contacted with 1.7 mL of 0.025 M aqueous Nd(NO$_3$)$_3$·6H$_2$O according to the procedure of Example 1. Complexometric titration showed an uptake of 861 mg Nd$^{3+}$/g, corresponding to a recovery of 97%. EDS analysis indicated an average adherence of about 64%, i.e. 830 mg per g SiO$_2$, which is in good agreement with the titration results, meaning that EDS provides reliable information about relative weight percentage and is a local surface analysis.

Example 8. Recovery of Neodymium from an Aqueous Solution by Means of 100 nm Surface Functionalised Silica Covered $Fe_3O_4$ Nanoparticles; pH Adjusted to pH 9.0 with Aqueous Ammonia The surface of core-shell magnetic silica covered nanoparticles of Example 7 was functionalized with the iminodiacetic acid organosilane derivate of Example 4. Nanoparticles (25 mg) were contacted with 3.2 mL of a 0.025M solution of $Nd(NO_3)_3 \cdot 6H_2O$ following the procedure of Example 1. Complexometric titration showed an uptake of 446 mg $Nd^{3+}$/g, which corresponds to a 96% of the initial amount introduced.

Example 9. Recovery of Dysprosium from an Aqueous Solution by Means of 100 nm Surface Functionalised Silica Covered $Fe_3O_4$ Nanoparticles; pH Adjusted to pH 9.5 with Aqueous NaOH Core-shell magnetic silica covered nanoparticles of Example 7 were used, and the procedure of Example 5 followed. EDS analysis showed an average (five scans) adherence of 733 mg $Dy^{3+}$ per g $SiO_2$.

Example 10. Recovery of Dysprosium from an Aqueous Solution by Means of 100 nm Surface Functionalised Silica Covered $Fe_3O_4$ Nanoparticles; pH Adjusted to pH 9.5 with Aqueous KOH The core-shell magnetic silica covered nanoparticles of Example 7 were used, and the procedure of Example 6 followed. EDS analysis showed an average (five scans) adherence of 898 mg $Dy^{3+}$ per g $SiO_2$.

Example 11. Recovery of Neodymium from an Aqueous Solution by Means of 0.5-10 µm Silica Microparticles; pH Adjusted to pH 9.0 with Aqueous Ammonia $SiO_2$ particles (100 mg) of 0.5-10 µm in diameter (CAS No: 14808-60-7, Sigma Aldrich, ref. S5631) were contacted with 12.5 mL of aqueous 0.025 M $Nd(NO_3)_3$ according to the procedure of Example 1. The loaded particles were checked by EDS analysis as in Example 2, revealing an average degree of adherence of about 700 mg $Nd^{3+}$ per g $SiO_2$.

Example 12. Recovery of Neodymium from an Aqueous Solution by Means of 44 µm Silica Microparticles; pH Adjusted to pH 9.0 with Aqueous Ammonia $SiO_2$ particles (44 µm/325 mesh in size, 100 mg; CAS No. 60676-86-0, Sigma Aldrich ref. 342890), were contacted with 12.5 mL of aqueous 0.025 M $Nd(NO_3)_3 \cdot 6H_2O$ while following the procedure of Example 1. Analysis of the loaded particles according to the method of Example 2 revealed an average adherence of about 1089 mg $Nd^{3+}$ per g $SiO_2$.

Example 13. Recovery of Neodymium from an Aqueous Solution by Means of 10 nm Titanium Oxide Nanoparticles; pH Adjusted to pH 9.0 with Aqueous Ammonia $TiO_2$ nanoparticles of 10 nm diameter were custom synthesized via a hydrothermal process [14]. The nanoparticles (40 mg) were contacted with 6.2 mL of aqueous 0.025 M $Nd(NO_3)_3 \cdot 6H_2O$ solution following the procedure of Example 1. The loaded particles were analysed by EDS as in Example 2, revealing an adherence of 48 mg $Nd^{3+}$ per g $TiO_2$.

Example 14. Recovery of Neodymium from an Aqueous Solution by Means of 10 nm Titanium Oxide Nanoparticles; pH Adjusted to pH 10.0 with Aqueous Ammonia $TiO_2$ nanoparticles of Example 13 (100 mg) were contacted with 6.2 mL of aqueous 0.025 M $Nd(NO_3)_3 \cdot 6H_2O$ and the pH adjusted to pH 10. The loaded particles were analysed by the method of Example 2, revealing an adherence 286 mg $Nd^{3+}$ per g $TiO_2$.

Example 15. Recovery of Neodymium from an Aqueous Solution by Means of 20 nm Titanium Oxide Nanoparticles; pH Adjusted to pH 9.0 with Aqueous Ammonia The procedure of Example 13 was followed. $TiO_2$ nanoparticles (20 nm, 100 mg; CAS No: 13463-67-7, Sigma Aldrich, ref. 718467) were contacted with 12.5 mL of aqueous 0.025 M $Nd(NO_3)_3 \cdot 6H_2O$. EDS analysis of the loaded particles showed an average adherence of 78 mg $Nd^{3+}$ per g $TiO_2$.

Example 16. EDS Analysis

The results of EDS analysis for the investigated samples are shown in Table 1.

REFERENCES

1. Broekaert J. A. C., Hörmann P. K., Analyt. Chim. Acta 124 (1981) 421-425;
2. Zhu Z. W., Pranolo Y., Cheng C. Y., Minerals Eng. 77(2015) 185-196;
3. Baba Y., Kubota F., Kamiya N., Goto M., J. Chem. Eng. Japan 44 (2011) 679-685;
4. Li X. Z., Sun Y. P., J. Rare Earths 23 (2005) 581-592;
5. Yang S., Zong P., Ren X., Wang Q., Wang X., ACS Appl. Mater. Interfaces 4 (2012) 6891-6900;
6. Younis A. M., Kolesnikov A. V., Desyatov A. V., Am. J. Analyt. Chem., 5 (2014) 1273-1284;
7. Zito Ray P., Shipley H. J., RSC Adv. 5 (2015) 29885-29907;
8. Dupont D., Brullot W., Bloemen M., Verbiest T., Binnemans K., ACS Appl. Mater. Interfaces, 6; 7 (2014) 4980-4988;
9. Haldorai Y., Rengaraj A., Ryu T., Shin J., Huh Y. S., Han Y. K., Mater. Sci. & Engineer. B, 195 (2015) 20-29;
10. Pogorilyi R. P., Melnyk I. V., Zub Y. L., Carlson S., Daniel G., Svedlindh P., Kessler V. G., Seisenbaeva G. A., RSC Adv. 4 (2014) 22606-22612;
11. Kavosi A., Faridbod F., Ganjali M. R., Int. J. Environ. Res. 9; 1 (2015) 247-254;
12. Stöber W., Fink A., Bohn, E., J. Colloid Interface Sci., 26; 1 (1968) 62-69.
13. Demirel S., Polido E., Tiseanu C., Rocha J., Nedelec J-M., Kessler V., Seisenbaeva G., J Nanopart Res., 16:2783 (2014).
14. Polido Legaria E., Demirel Topel S., Kessler V. G., Seisenbaeva G. A., Dalton Trans., 2015, 44, 1273-1282.

TABLE 1

Results of EDS analysis

| Sample | % Fe | % Si | % Ti | % Nd | % La | % Dy | % K | % Al (from the sample holder) |
|---|---|---|---|---|---|---|---|---|
| $SiO_2$ custom NPs, Nd, pH = 8 ($NH_4OH$) | — | 53.9 | — | 38.4 | — | — | — | 7.8 |
| $SiO_2$ custom NPs, Nd, pH = 9 ($NH_4OH$) | — | 62.6 | — | 37.4 | — | — | — | — |
| $SiO_2$ custom NPs, Nd, pH = 10 ($NH_4OH$) | — | 33.2 | — | 66.8 | — | — | — | — |
| $SiO_2$-L3 custom NPs, Nd, pH = 9 ($NH_4OH$) | — | 62.3 | — | 37.4 | — | — | — | — |
| $SiO_2$-L3 custom NPs, Dy, pH = 9 ($NH_4OH$) | — | 44.1 | — | — | — | 55.9 | — | — |
| $SiO_2$-L3 custom NPs, La, pH = 9 ($NH_4OH$) | — | 53.8 | — | — | 46.2 | — | — | — |
| $SiO_2$ custom NPs, Dy, pH = 9.5 (NaOH) | — | 12.6 | — | — | — | 87.4 | — | — |
| $SiO_2$ custom NPs, Dy, pH = 9.5 (KOH) | — | 35.5 | — | — | — | 63.4 | 0.6 | — |
| □—$Fe_2O_3$—$SiO_2$ NPs, La, pH = 9 ($NH_4OH$) | 36.5 | 21.1 | — | — | 42.4 | — | — | — |
| □—$Fe_2O_3$—$SiO_2$ NPs, Nd, pH = 9 ($NH_4OH$) | 15.6 | 16.8 | — | 63.7 | — | — | — | 4.1 |
| □—$Fe_2O_3$—$SiO_2$ NPs, Dy, pH = 9.5 (NaOH) | 23.9 | 14.9 | — | — | — | 61.1 | — | — |
| □—$Fe_2O_3$—$SiO_2$ NPs, Dy, pH = 9.5 (KOH) | 17.4 | 16.5 | — | — | — | 65.8 | 0.3 | — |
| $SiO_2$ microsize, Nd, pH = 9 | — | 42.2 | — | 57.8 | — | — | — | — |
| $SiO_2$ ~325 mesh, Nd, pH = 9 ($NH_4OH$) | — | 31 | — | 69 | — | — | — | — |
| $TiO_2$ 10 nm NPs pH = 9 ($NH_4OH$) | — | — | 86.1 | 7.4 | — | — | — | 6.5 |
| $TiO_2$ 10 nm NPs pH = 10 ($NH_4OH$) | — | — | 55.5 | 32.3 | — | — | — | 12.2 |
| $TiO_2$ 20 nm NPs pH = 9 ($NH_4OH$) | — | — | 88.5 | 11.5 | — | — | — | — |

The invention claimed is:

1. A process for separation of rare earth elements (REE) from calcium and magnesium, characterized in that the process comprises the following steps:

a) providing an acidic aqueous solution of REE, calcium and magnesium;

b) adding a base to bring the pH of the solution to a pH in the range of pH 8 to pH 11, to form REE hydroxide;

c) adding nano- or micro- particles selected from silica particles, titanium oxide particles and particles covered by a layer of silica to the solution to provide a particle suspension;

d) agitating the particle suspension for a time period of from 6 h to 48 h, to provide for adherent crystallization of REE hydroxide on the particles;
e) separating the particles loaded with REE hydroxide from the aqueous solution;
f) releasing REE from the particles by treatment with aqueous acid to form an aqueous solution of REE salt;
g) separating the non-loaded particles from the aqueous solution of REE salt;

with the proviso that step c) can precede step b).

2. The process of claim 1, wherein the process is carried out at ambient temperature.

3. The process of claim 1, wherein particles covered with silica are iron(III) oxide particles.

4. The process of claim 1, wherein particles loaded with REE hydroxide are separated from the aqueous solution by filtration, decantation, centrifugation or by magnetic means.

5. The process of claim 1, wherein the base is selected from ammonia, sodium hydroxide, potassium hydroxide.

6. The process of claim 5, wherein the base is provided in form of an aqueous solution.

7. The process of claim 1, wherein the thickness of the silica layer is 10 μm or more.

8. The process of claim 1, wherein non-loaded particles are separated in step g) from the aqueous solution of REE salt by filtration, decantation, centrifugation or by magnetic means.

9. The process of claim 1, wherein treatment with aqueous acid is carried out at pH 2 or lower.

10. The process of claim 1, wherein the aqueous acid is selected from the group consisting of nitric acid, hydrochloric acid, hydrobromic acid.

11. The process of claim 1, wherein the acidic aqueous solution of REE, calcium and magnesium of step a) is provided by:
   i) leaching a mineral comprising REE with aqueous acid at pH 2 or lower to form an acidic solution comprising REE, magnesium, calcium, iron(III);
   ii) adding a base to bring the pH of the leaching solution to a pH of from 4.0 to 6.5;
   iii) separating precipitated iron(III) hydroxide by means of filtration, decantation or centrifugation so as to obtain said aqueous solution of REE, calcium and magnesium of step a).

12. The process of claim 11, wherein the base of step ii) is selected from ammonia, sodium hydroxide, potassium hydroxide.

13. The process of claim 1, wherein REE is selected from the group consisting of lanthanum, dysprosium, neodymium.

14. The process of claim 1, wherein the particles have a diameter of 5 nm to 100 μm.

15. The process of claim 1, wherein pH of the aqueous solution provided in step a) is continuously monitored.

16. The process of claim 11, wherein pH of the acid solution provided in step i) is continuously monitored.

17. The process of claim 1, wherein the base is provided in form of an aqueous solution thereof.

18. The process of claim 11, wherein the base of step ii) is provided in form of an aqueous solution thereof.

19. The process of claim 1, wherein step (b) comprises adding a base to bring the pH of the solution to a pH in the range of pH 9 to pH 10.

20. The process of claim 1, wherein the agitating of (d) is done for 12 h to 36 h.

* * * * *